June 16, 1959  W. D. ELLISON  2,890,532
MANUAL POWER DIGGER
Filed Sept. 6, 1957  3 Sheets-Sheet 1
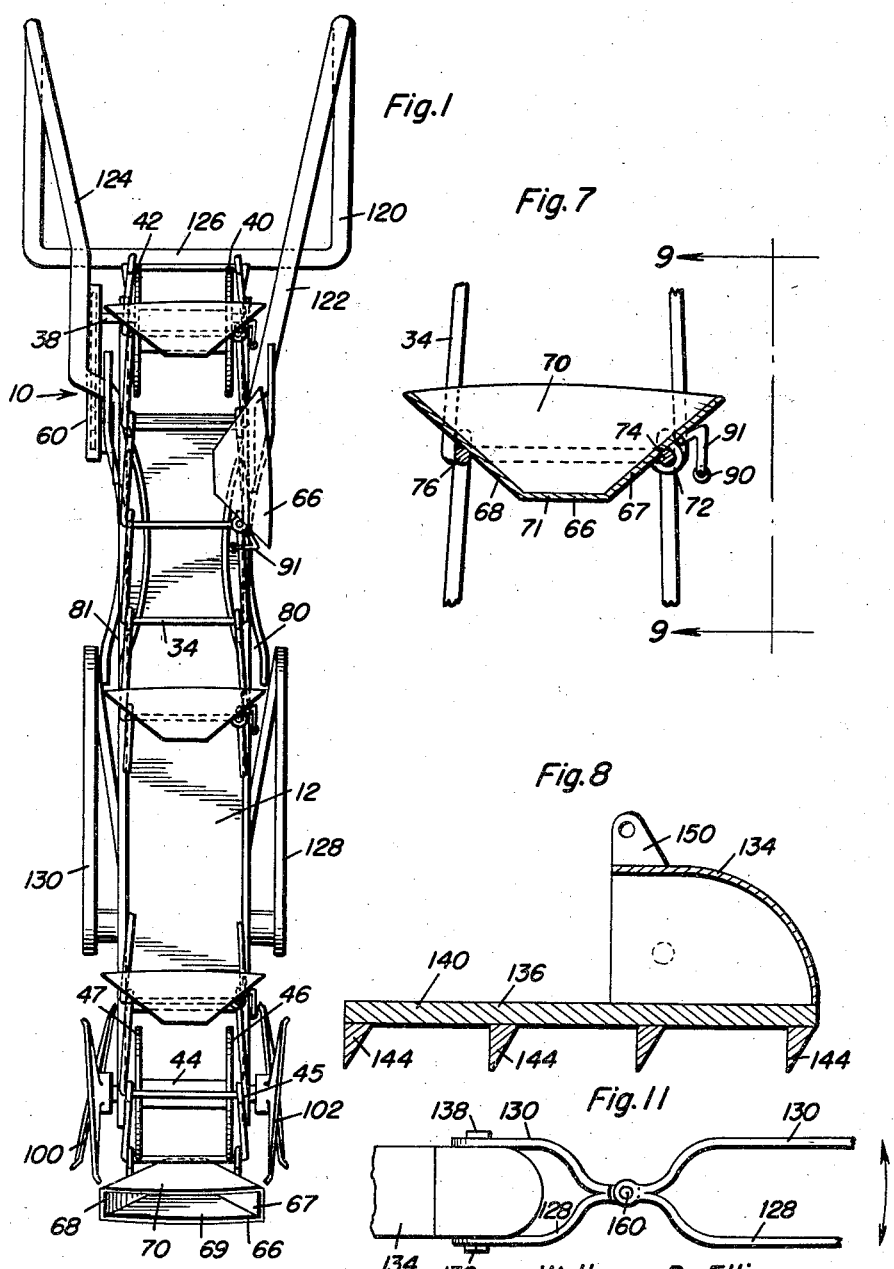
Wallace D. Ellison
INVENTOR.

June 16, 1959 W. D. ELLISON 2,890,532
MANUAL POWER DIGGER
Filed Sept. 6, 1957 3 Sheets-Sheet 2
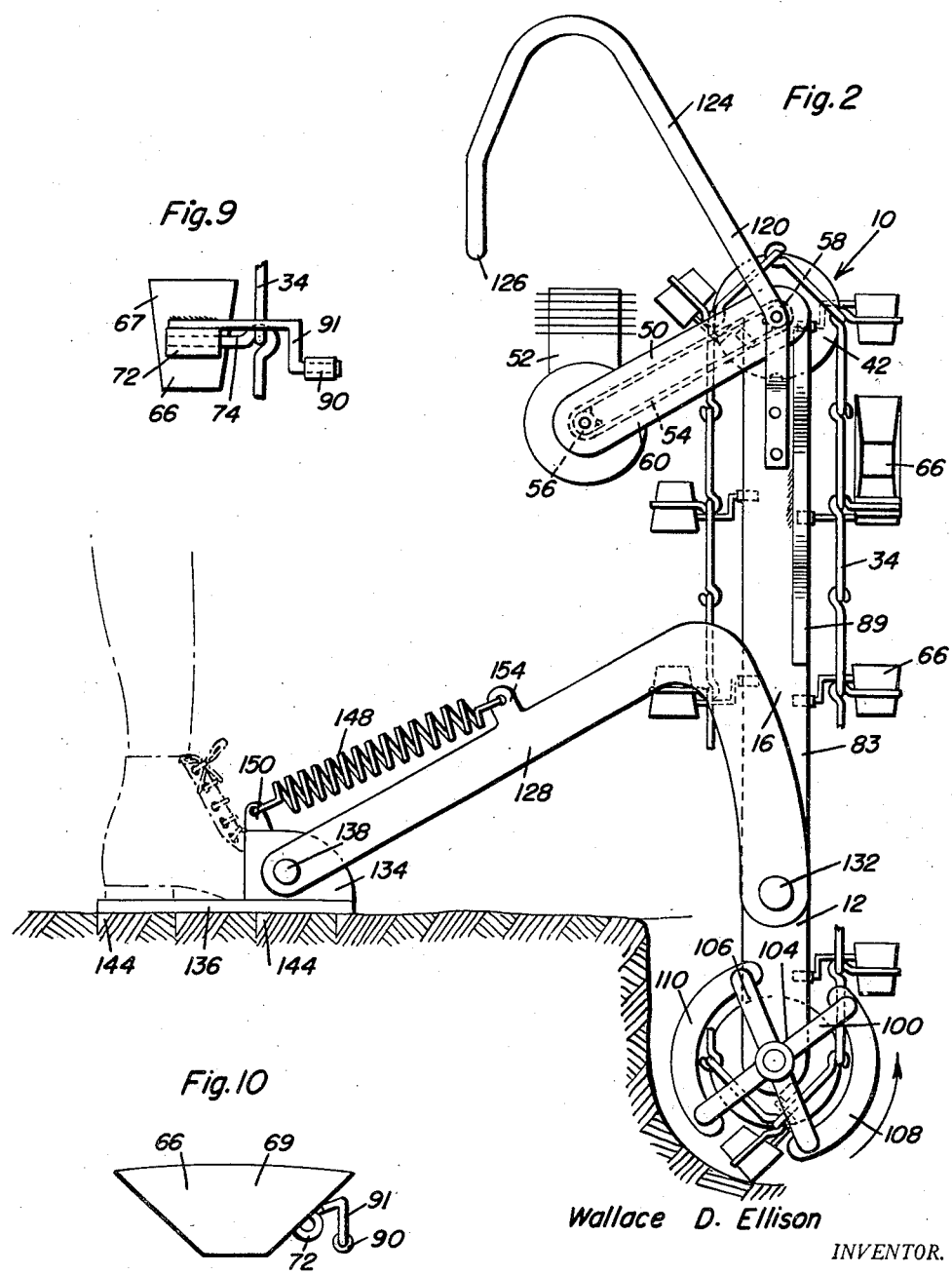
Wallace D. Ellison
INVENTOR.

June 16, 1959  W. D. ELLISON  2,890,532
MANUAL POWER DIGGER
Filed Sept. 6, 1957  3 Sheets-Sheet 3
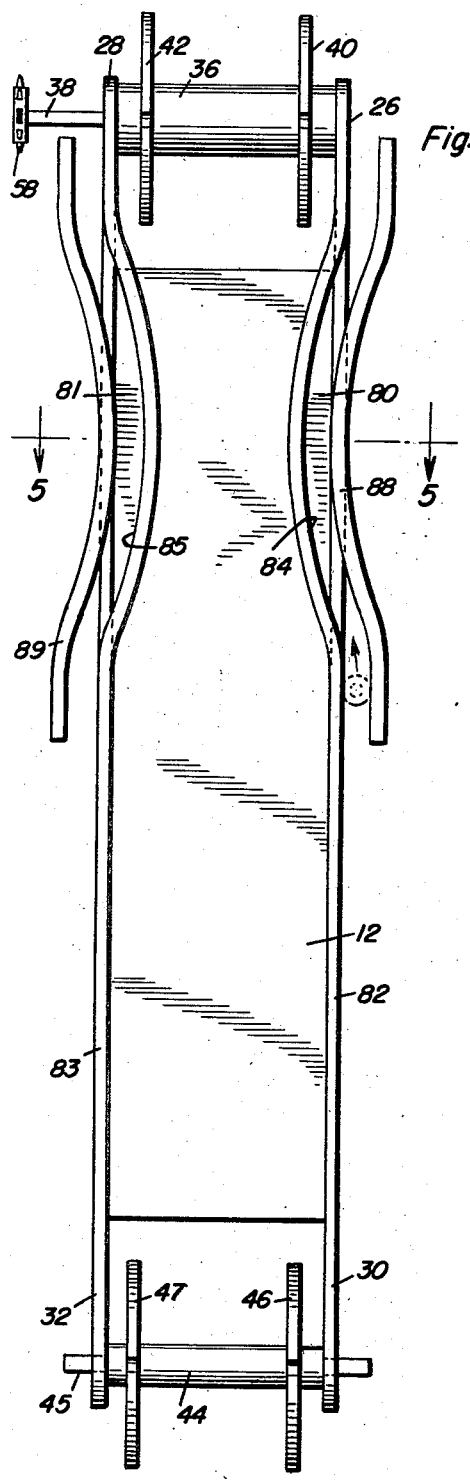
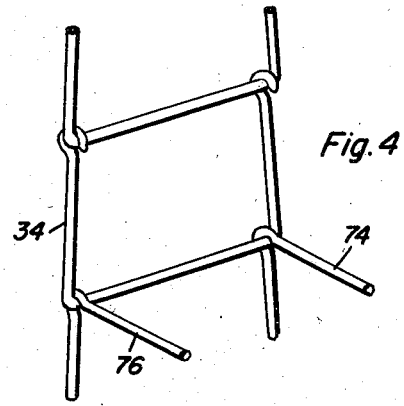
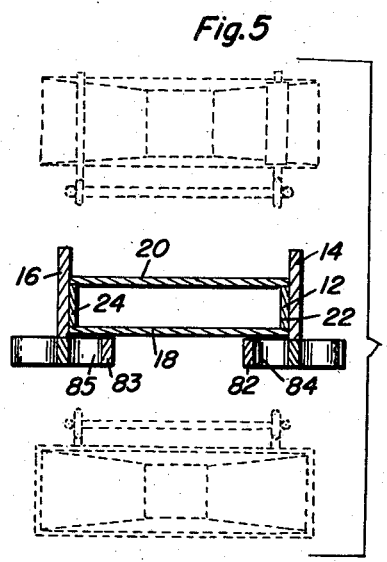
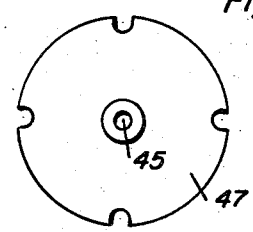
Wallace D. Ellison
INVENTOR.

United States Patent Office 2,890,532
Patented June 16, 1959

2,890,532

MANUAL POWER DIGGER

Wallace D. Ellison, Los Angeles, Calif.

Application September 6, 1957, Serial No. 682,519

14 Claims. (Cl. 37—86)

This invention relates to a powder digger and particularly to a mobile power digger which is adapted to be operated by a single walking attendant.

The invention is embodied in a digger which is hand operated by one man and does the work of a common pick and shovel in most familiar operations. The digger is designed to operate in confined and restricted areas where larger, wheeled or track-conveyed power shovels, ditch diggers, trenchers, etc., cannot operate. Accordingly, an object of the invention is to provide a portable, one-man operated shovel type digger which has an upright frame supporting an endless conveyor that has a number of buckets on it. A small electric or gasoline motor is attached to the frame and drives the endless conveyor whose lower end performs the actual digging operation while the attendant holds the frame in position by a lever-stirrup assembly and while the operator tilts the frame by a handle that is attached to the frame.

A further object of the present invention is to provide a digger of the type described above wherein there are lower side mounted cutters that function as augers whereby the sides of the hole or trench that is being dug are shaved. The augers are so constructed that they deliver the cut soil to the region of the buckets so that the soil is collected in the buckets and discharged.

Another object of the invention is to provide a portable digger of the type which uses an endless conveyor supporting a number of buckets, the buckets being arranged to discharge laterally from the path of travel of the conveyor by a unique cam and cam follower assembly, the cam being carried by the frame of the machine while the cam followers are attached to individual buckets. It is preferred that the endless conveyor have means by which to pivotally support the individual buckets near one side of the buckets so that when the endless conveyor is actuated, the cam and cam following tilting means for the buckets are automatically brought into motion thereby automatically emptying the buckets by lateral discharge during the normal operation of the endless conveyor. In addition, each bucket is arranged to be held on a support provided especially for it in the endless conveyor. In this way the buckets are made interchangeable so that they are capable of discharging either to the right or to the left of the machine. In some cases it is preferred to discharge on one side rather than the other and therefore, the machine is so constructed.

One of the new features of the digger is the manner by which it is supported during the operation of the digger. The operator places one foot in the stirrup and applies enough weight to stretch the stirrup spring and secure the stirrup lugs in the ground. The stirrup spring applies a force on the lever that supports the stirrup thereby forming a moment in the lever tending to lift upward on the outer end of the lever. This relieves the operator of a part of the dead weight load of the digger enabling the operator to manipulate the handles fore and aft, up and down and thereby guide the digger while the motor operated bucket supporting conveyor does the majority of the work. The maneuvering of the digging buckets on the bottom of the hole or trench loosen, dig and scoop up the soil so that it is easily collected by the buckets as they continue in their path of travel, and then discharge laterally from the conveyor. The digger is moved to a new position by lifting simultaneously on the handles and the one foot that is in the stirrup. The weight of the entire digger is more easily handled in this way.

Another object of the invention is to provide a practical, portable digger which is reliant on the operation of an engine for the principal motive force to achieve the digging operation, the digger featuring ease of operation and maneuverability as well as dependability.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational front view of a typical digger which is constructed in accordance with the principles of the invention;

Figure 2 is an elevation side view of the digger in Figure 1 but showing the same in use;

Figure 3 is an elevational front view of the frame and parts of one type of endless conveyor used thereon, this view also showing the cam tracks on the outer edges of the frame which are used as a part of the means for tilting and returning the buckets at the proper place in the path of travel thereof whereby the buckets are emptied and then returned for further digging operations;

Figure 4 is a fragmentary perspective view of a typical conveyor having means thereon by which to support one bucket of the group of buckets;

Figure 5 is a transverse sectional view taken approximately on the line 5—5 of Figure 3 and showing in dotted line representation, the dispositions of two buckets and the endless conveyor supporting the buckets;

Figure 6 is an elevational view of the bottom rotating part of the endless conveyor;

Figure 7 is a fragmentary sectional view of one of the buckets supported on the endless conveyor;

Figure 8 is a longitudinal sectional view of the stirrup used in the invention;

Figure 9 is an elevational view taken approximately on the line 9—9 of Figure 7 and in reduced scale;

Figure 10 is a view of the bucket similar to the view illustrated in Figure 7 but taken in elevation; and Figure 11 is a fragmentary top view showing a modification of the digger.

In the accompanying drawings there is a portable one-man operated power digger 10. Digger 10 is made of a main frame 12. Although the main frame may be built up in a number of ways, the illustration of frame 12 is shown as being constructed of side plates 14 and 16, front panel 18 and rear panel 20, the panels being attached to the side plates or sides 14 and 16. Spacers 22 and 24 are attached to the inner surfaces of the sides 14 and 16 and extend between panel 20 and 18 in order to form a rigid construction. The upper ends and the lower ends of sides 14 and 16 protrude above and below respectively the panels 18 and 20 thereby providing upper mounting ears 26 and 28 together with lower mounting ears 30 and 32 between which an upper rotating part and a lower rotating part of endless conveyor 34 are mounted for rotation. The upper rotating part consists of a spool 36 fixed to shaft 38 that protrudes through aligned holes in the mounting ears 26 and 28. Sprocket wheels 40 and 42 are secured to the spool 36 and are rotated with the spool. The lower rotating part of the endless conveyor consists of a spool 44 which is mounted on a shaft 45 that is disposed in aligned openings in the lower mounting ears 30 and 32. Sprocket wheels 46 and 47 are attached to the spool 44 for rotation therewith. Thrust bearings are at the ends of the sprocket wheels and keep them centered properly between the upper and lower ears of the frame.

A motor mounting plate 50 is secured to one side plate 16 and has a prime mover 52 carried thereby. This prime mover is preferably an internal combustion engine although other prime movers may be adopted, for example electric motors. A power transmission means drivingly connects shaft 38 to the power take-off of motor 52. The power transmission means may assume several configurations, one being drive chain 54 which is entrained around sprocket 56 on the shaft of the motor and around sprocket 58 which is fixed to one end of shaft 38. A chain guard 60 is located around the chain. Another simple power transmission means would be one or more belts together with pulleys to take the place of the chain and sprockets. By driving the shaft 38, endless conveyor 34 which is entrained around the upper and lower sprockets, is correspondingly actuated. Although a link chain type of endless conveyor is illustrated it is understood that any other type of standard conveyor may be adopted. It is required, though, that the endless conveyor be capable of supporting the buckets 66 and propelling them in the proper path of travel to achieve a digging operation. Buckets 66 have diverging sides 67 and 68, upper and lower walls 69 and 70 and a bottom wall 71. Each bucket, for example typical bucket 66, has a pair of eyes or a sleeve 72 attached to one of the side walls 67 thereof in which to accommodate pivot pin 74. This pin is attached at its inner end to the endless conveyor and protrudes forwardly therefrom as to the front flight of the conveyor and rearwardly therefrom as to the rear flight of the conveyor. An identical pivot pin 76 is laterally spaced from pivot pin 74 but functions as a support on which to seat the side wall 68 of the bucket 66.

There are means operatively connected with the frame 12 and the buckets of the endless conveyor for tilting the buckets in such a manner as to discharge laterally from the endless conveyor. Thereafter the same means return the buckets to the upright position in preparation for further digging operations. These means consist of cam tracks 80 and 81 (Figure 3) which are formed on the front part of the frame 12. They are made by attaching additional strips to the front edges of sides 14 and 16 or by extending the strips so that they rise from the front face of panel 18. These strips 82 and 83 are curved inwardly forming lateral wells 84 and 85 intermediate the upper and lower ends of the strips. Guide strips 88 and 89 are welded or otherwise secured to the frame 12 and are located in parallel super position to the wells 84 and 85. These guide strips are to assure that the cam followers 90 on the ends of cranks 91 that are attached to the buckets, for example bucket 66, remain within the cam tracks. By having the tracks shaped as arcuate wells and returning in the manner described, the cranks (Figure 9) that are welded or otherwise attached to the buckets will be required to move inwardly of the longitudinal axis of the frame 12 as the conveyor is held, thereby twisting the bucket so that it must rotate about the axis of pivot 74. Such rotation lifts the bucket off the support 76 and spills the contents of the bucket to the side of the endless conveyor and frame. Thereafter the shape of the cam tracks are such that they require the cam follower 90 and crank 91 to return to the initial position which requires the bucket 66 to again seat on support 76. Two cam tracks are illustrated and described. The purpose of having the duplication is to provide for left or right hand discharge of the buckets.

The side to which the buckets discharge is controlled by the disposition of cranks 91, the buckets discharging to that side upon which the cranks are disposed. The outer surfaces of strips 82 and 83 always have contact with the cam followers 90 during the complete cycle of operation of the machine. It is only when the cam followers enter the cam tracks that the cam followers are caused to deviate from a rectilinear path of travel.

In the actual digging operation, the buckets act as cutters and also as means by which to accumulate the soil and elevate it and spill it to the side. In addition the sides of the hole or trench being dug are cut and straightened by two cutters 100 and 102 which are attached to the ends of shaft 45. These cutters are not only cutters but they are augers to deliver the cut soil toward the center line of the frame 12 so that it may be picked up by the buckets as they are in their normal travel. Cutter 100 is made of two crossed arms 104 and 106 that have cutting edges, and these arms are at an angle to each other. Arcuate knives 108 and 110 are secured to the extremities of the crossed arms to form cutting and soil propelling operations. The arms are essentially attached to a hub which is secured by standard means, to the shaft 45. Cutter 102 is identical to the cutter 100.

The handle 120 is made of a pair of side bars 122 and 124 fixed to the sides of frame 12 together with a cross member 126 at the outer ends of the side bars, is arranged for the convenience of the operator. Therefore the side 122 and the side 124 are curved so as to present themselves to the hands of the operator at a convenient angle. A pair of levers 128 and 130 are specially angulated and mounted for pivotal movement on a transverse pivot pin 132 or a pair of trunnions which are secured to the sides of the frame 12. The levers 128 and 130 converge to the sides of the toe case 134 of stirrup 136 at which they are pivoted on trunnions 138 carried by the toe case. Sole plate 140 of stirrup 136 has a number of projections 144 which are adapted to bite into and anchor in the ground. A tension spring 148 is secured in a hole on ear 150 that rises from toe case 134 and in a hole in ear 154 on lever 128. The normal position of the stirrup would be with the spring 148 pulling it toward the upper surface of the levers 128 and 130.

In operation, the user puts one foot in the stirrup 136 and applies enough force in a down direction to anchor the projections 144 in the soil. This stretches spring 148 thereby applying a force onto the levers 128 and 130 and thereby enables the operator to partially support the dead weight of the machine by his foot. Then, after the engine 52 is set in motion, the endless conveyor is actuated propelling the buckets and the auger type cutters. The operator rocks the frame about trunnions 132, raising it and lowering it so that the augers and the buckets dig into the soil and lift charges thereof that are accumulated in the buckets. The axes of movement of the frame are through trunnions 132 and 138.

When power is applied to the upper rotating part of the endless conveyor that is, shaft 38, the conveyor is propelled thereby carrying the buckets with it. The buckets accumulate the soil that they dig and also the soil that is dug by the auger cutters 100 and 102. They lift the accumulated soil and when the cam followers enter the wells in the cam 84 or 85 depending on whether there is to be a left or right hand discharge of soil, the buckets are required to tilt to an emptying position and then are subsequently required by the shape of the cam well to return to the upright position.

The foregoing is considered as illustrative only of the principles of the invention. Numerous modifications and changes falling within the scope of the claims will readily occur to those skilled in the art. For example, a removable wheel or caster for conveying the machine to and from the job may be connected to the frame of the machine. Although one type of conveyor chain is shown, a production unit equally well uses another standard type of chain constructed of forged links with two pivot pins as an integral part at the ends thereof. Figure 11 shows a modification enabling the manual power digger to be swung from side to side permitting it to work a larger area without moving the digger to a new spot. This is accomplished by placing a pivot pin in levers 128 and 130 near their pivot connection by pin 138 to stirrup 134. The longitudinal axis of pivot 160 is at approximately right angles to pivot pins 138 and 132.

What is claimed as new is as follows:

1. A power digger for a single walking operator, said digger comprising an upright frame, an endless conveyor carried by said frame, a plurality of buckets propelled by said endless conveyor, means pivotally securing said buckets to said conveyor for pivotal emptying motion to unload to a side of said conveyor when said conveyor is actuated, and means connected with said frame and each bucket to so pivotally actuate and return said buckets.

2. A power digger for a single walking operator, said digger comprising an upright frame, an endless conveyor carried by said frame, a plurality of buckets propelled by said endless conveyor, means pivotally securing said buckets to said conveyor for pivotal emptying motion to unload to a side of said conveyor when said conveyor is actuated, means connected with said frame and each bucket to so pivotally actuate and return said buckets, and a support for each bucket attached to said endless conveyor and on which said buckets are adapted to be disposed until separated from said supports by said bucket pivotal actuating means.

3. A power digger for a single walking operator, said digger comprising an upright frame, an endless conveyor carried by said frame, a plurality of buckets propelled by said endless conveyor, means pivotally securing said buckets to said conveyor for pivotal emptying motion to unload to a side of said conveyor when said conveyor is actuated, means connected with said frame and each bucket to so pivotally actuate and return said buckets, a support for each bucket attached to said endless conveyor and on which said buckets are adapted to be disposed until separated from said supports by said bucket pivotal actuating means, a lever, a pivot pin connecting one end of said lever to said frame, a stirrup attached to said lever by which the operator may hold the lever anchored at one end, and a handle secured to said frame to oscillate said frame about said pivot pin while constraining the motion of said pin in space by said lever.

4. The power digger of claim 3 wherein said stirrup is pivotally attached to said lever, and a spring attached to said lever and to said stirrup to yieldingly apply a force between said lever and stirrup to aid in supporting the power digger frame.

5. A power digger for a single walking operator, said digger comprising an upright frame, an endless conveyor carried by said frame, a plurality of buckets propelled by said endless conveyor, means pivotally securing said buckets to said conveyor for pivotal emptying motion to unload to a side of said conveyor when said conveyor is actuated, means constituting a part of said frame and connected with each bucket to so pivotally actuate and return said buckets, and a support for each bucket attached to said endless conveyor and on which said buckets are adapted to be disposed until separated from said supports by said bucket pivotal actuating means.

6. The power digger of claim 5 wherein said endless conveyor has a rotating part carried by said frame, a motor carried by said frame, and means drivingly connecting said motor to said rotating part of said conveyor.

7. The power digger of claim 5 wherein said endless conveyor has a rotating part carried by said frame, a motor carried by said frame, and means drivingly connecting said motor to said rotating part of said conveyor, said conveyor having a second rotating part located near the lower end of said frame, and side cutters on said second rotating part and adjacent the outer sides of said frame.

8. A power digger for a single walking operator, said digger comprising an upright frame, an endless conveyor carried by said frame, a plurality of buckets propelled by said endless conveyor, means pivotally securing said buckets to said conveyor for pivotal emptying motion to unload to a side of said conveyor when said conveyor is actuated, means connected with said frame and each bucket to so pivotally actuate and return said buckets, a support for each bucket attached to said endless conveyor and on which said buckets are adapted to be disposed until separated from said supports by said bucket pivotal actuating means, said means to actuate and return said buckets comprising a cam track on said frame, a crank attached to each bucket, and a cam follower on each crank and in engagement with said cam track, a lever, a pivot pin connecting one end of said lever to said frame, a stirrup attached to said lever by which the operator may hold the lever anchored at one end, and a handle secured to said frame to oscillate said frame about said pivot pin.

9. In a power digger, the combination of a frame, an endless conveyor on said frame, a plurality of buckets pivotally carried by said endless conveyor, means connected with said buckets for maintaining said buckets in a predetermined erect position while the buckets gather soil, and for pivotally actuating the buckets to tilt the same to an emptying position during a part of the travel thereof, means pivotally connected to said frame for partially supporting the frame while a single operator oscillates the frame to various digging positions, said means to partially support the frame including a lever, a stirrup pivoted to said lever, and a tension spring attached to said stirrup and said lever for opposing the movement of said stirrup with respect to said lever in one direction so as to enable the operator to partially support the dead weight of the machine by the stirrup.

10. The machine of claim 9 wherein there are projections on said stirrup by which to anchor the same in the soil.

11. The machine of claim 9 wherein said endless conveyor includes an endless member engaged with a rotating part on said frame, a second rotating part carried by said frame over which said endless member is entrained, and side augers attached to said second rotating part for digging the soil and delivering the same toward the central longitudinal axis of said frame for accumulation in said buckets.

12. The machine of claim 9 wherein said endless conveyor has pairs of pins protruding therefrom, said buckets each having on one side thereof means adapted to fit on one of said pairs of pins to pivotally attach the bucket to one pin of each pair.

13. A manual power digger for a single walking operator, said digger comprising an upright frame, an endless conveyor carried by said frame, a plurality of buckets propelled by said endless conveyor, a lever, a pivot pin connecting one end of said lever to said frame, a stirrup attached to said lever by which the operator may hold the lever anchored at one end, and a handle secured to said frame to oscillate said frame about said pivot pin while holding said latter end of said lever fixed by said stirrup.

14. The manual power digger of claim 13 wherein said stirrup is pivotally attached to said lever, and a spring attached to said lever and to said stirrup to yieldingly apply a force between said lever and stirrup to aid in supporting the power digger frame.

(References on following page)

References Cited in the file of this patent

UNITED STATES PATENTS

| | | |
|---|---|---|
| 13,646 | Goodrum | Oct. 9, 1855 |
| 329,710 | Bricker | Nov. 3, 1885 |
| 413,060 | Howard | Oct. 15, 1889 |
| 1,132,720 | Hubbard | Mar. 23, 1915 |
| 1,441,314 | Von Canon | Jan. 9, 1923 |
| 1,521,955 | Klara | Jan. 6, 1925 |
| 1,740,923 | Jaeger | Dec. 24, 1929 |
| 2,165,904 | Osgood | July 11, 1939 |

FOREIGN PATENTS

| | | |
|---|---|---|
| 423,578 | France | Feb. 18, 1911 |